United States Patent [19]

Babai et al.

[11] Patent Number: 4,499,160
[45] Date of Patent: Feb. 12, 1985

[54] CATHODE AND ELECTROCHEMICAL CELL CONTAINING SAME

[76] Inventors: Matzliach Babai, 4, Bertonov St., Petah Tiqua; Uzi Maishar, 4, Mordechai St., Ramat Hasharon, both of Israel

[21] Appl. No.: 505,118

[22] Filed: Jun. 20, 1983

Related U.S. Application Data

[63] Continuation of Ser. No. 269,970, Jun. 3, 1981, abandoned.

[30] Foreign Application Priority Data

Jun. 5, 1980 [IL] Israel ......................................... 60238

[51] Int. Cl.³ ........................ H01M 4/36; H01M 6/36; H01M 4/58; H01M 6/14
[52] U.S. Cl. .................................. 429/101; 429/116; 429/196; 429/217; 429/218; 429/221; 429/223
[58] Field of Search ............... 429/101, 218, 115, 116, 429/110, 118, 196, 40–45

[56] References Cited

U.S. PATENT DOCUMENTS

| | | | |
|---|---|---|---|
| 3,413,152 | 11/1968 | Folkins et al. | 429/40 X |
| 3,877,994 | 4/1975 | Chottinger | 429/42 |
| 3,998,658 | 12/1976 | Dey | 429/218 X |
| 4,020,248 | 4/1977 | Goebel | 429/218 X |
| 4,031,296 | 6/1977 | Sarbacher | 429/116 |
| 4,041,220 | 8/1977 | Armand | 429/218 X |
| 4,136,213 | 1/1979 | Freng et al. | 429/218 X |
| 4,148,974 | 4/1979 | Eppley | 429/101 |
| 4,150,198 | 4/1979 | Domeniconi et al. | 429/116 |
| 4,310,609 | 1/1982 | Liang et al. | 429/218 X |

Primary Examiner—Charles F. Lefevour
Attorney, Agent, or Firm—Toren, McGeady and Stanger

[57] ABSTRACT

A novel composite cathode for use in electrochemical lithium reserve cells comprising a self-supporting structure or a grid-supported structure of porous carbon, a binder and a transition metal oxide. Such cathodes are prepared by slurrying porous carbon, possibly with graphite, with a binder, applying to a support, drying, applying a transition metal nitrate or hydrate of such nitrate, and decomposing said nitrate. Reserve cells comprising such cathodes are also disclosed.

16 Claims, 2 Drawing Figures

CATHODE AND ELECTROCHEMICAL CELL CONTAINING SAME

This is a continuation of application Ser. No. 269,970, filed June 3, 1981, now abandoned.

FIELD OF THE INVENTION

The present invention relates to a novel type of composite cathode for use in electrochemical reserve cells and methods for the formation of such cathodes. The novel cathode is of special use in reserve cells having a negative electrode comprising a highly electropositive metal such as lithium.

The invention further relates to electrochemical cells with such cathodes, and especially to lithium reserve cells provided with such composite cathodes.

BACKGROUND OF THE INVENTION

Modern technology has placed emphasis on electrochemical power sources of light weight, small size, high power and a wide range of working temperatures, coupled with characteristics of long shelf life and fast initial power response.

There are known various reserve cells which are characterized in that the electrolyte is stored in a sealed container which is shattered when the cell is activated, thus contacting the electrolyte with the other components of the cell (anode, cathode and separator) and allowing current to be drawn. Some of the high voltage, high energy density reserve cells are of the type using lithium as anode. Generally, lithium primary cells are known which make use of either an aprotic organic solvent (organic electrolyte cells), or an inorganic solvent (inorganic electrolyte cells). In both cases inorganic salts are dissolved in the solvent to achieve good conductivity.

While the solvent in the case of inorganic electrolyte cells can serve as the cathode depolarizer as well, the organic cells contain additionally a depolarizer which may be soluble or insoluble in the organic solvent.

In both types of cells a porous carbon cathode serves as the catalytic surface on which the reduction of the inorganic solvent itself, or the reduction of the soluble depolarizer or the insoluble depolarizer mixed with the cathode, takes place.

As an example of the prior art there may be quoted U.S. Pat. No. 4,150,198 (1979) of Domeniconi and Murphy for GTE Labs Inc. There is described a reserve cell comprising a lithium anode, separator and carbon cathode, in which the electrolyte comprises a covalent oxyhalide or thiohalide solvent with a Lewis acid as the sole additive solute. A prominent drawback of prior art reserve cells of this type is the long rise time to an acceptable working voltage on current drain and poor power characteristics, particularly at low temperatures. It should be noted that the cathode of the prior art cells is an uncatalyzed, electrically conducting, inert current collector.

SUMMARY OF THE INVENTION

According to the present invention, there is provided a novel composite cathode which ensures a fast activation of reserve cells, and especially of reserve cells of the lithium type. The novel cathodes provide for a fast activation and for a high current drain, especially at low temperatures. The invention relates to various electrochemical cells in which such composite carbon cathodes are used and methods for the formation of the cathode.

The novel cathode according to the present invention comprises a carbon structure in combination with a transition metal oxide. The cathode advantageously comprises a sheet of carbon particles or a layer of carbon particles, said carbon particles being provided with a transition metal oxide as additive and/or surface layer. The additive may chemically modify the surface of the carbon by formation of a compound between the transition metal, the carbon, and probably oxygen.

DESCRIPTION OF THE PREFERRED EMBODIMENT

Figure 1:
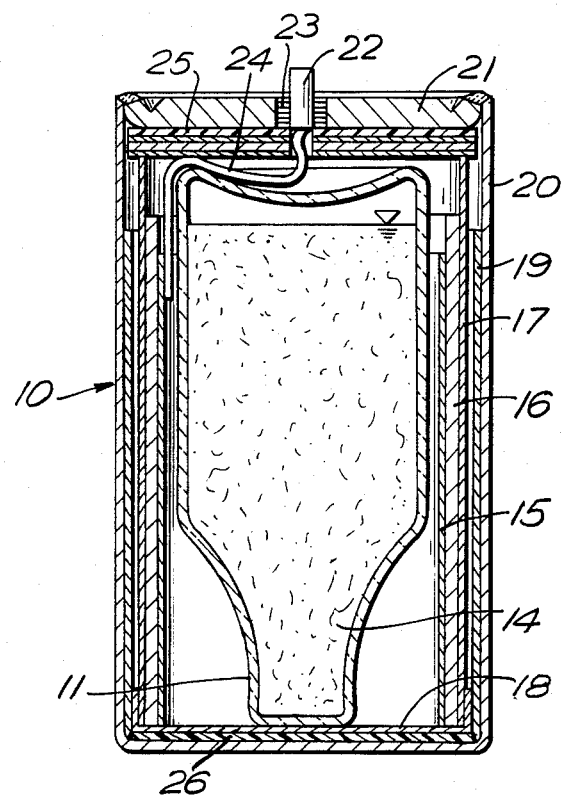
FIG. 1 is a cross-sectional view of the cathode in accordance with the present invention.

The cathode is advantageously porous and a preferred embodiment comprises about 40 to 99% by weight carbon black, possibly in admixture with graphite, from 0.5 to 20 percent of mechanical binder which is stable for the operating time of the reserve cell, and from 0.01 to 40 percent, and preferably from 0.02 to 25% of a transition metal oxide the latter being expressed in terms of the resulting cathode material.

The preferred transition metal oxides are those of nickel, cobalt, chromium, and iron. The transition metals are advantageously applied in the form of the corresponding transition metal nitrate, which is easily converted to the desired oxide. The preferred conversion is by the application of an elevated temperature.

The carbon black is advantageously compressed about 50 percent. Carbon black, graphite and the transition metal compounds are used in commercial grade purity or better purity. The mechanical binder serves to provide a self-supporting cathode structure. According to the type of cell, the kind of binder has to be chosen in such a manner as to be inert in the environment of the active cell for the duration of its activated life. A fluorocarbon polymer binder of the tetrafluoroethylene type is presently preferred.

The transition metal nitrate (with or without waters of crystallization) is dissolved in a suitable solvent which wets the carbon particles, and advantageously an easily evaporable liquid is used, which leaves no residue upon evaporation. In some cases residue is permitted provided it is inert to the anode material in the unactivated state of the cell, and inert to the anode and electrolyte in the activated state for the period of operation of the cell. Suitable liquids are water, alcohols, acetone, ethylene glycol, methyl ethyl ketone, diethyl ether etc, and mixtures of these. Water or lower alcohols are presently preferred.

A concentration of transition metal nitrate in the solution of from about 0.01% by weight to about 70% by weight can be used. The porous carbon structure is impregnated with such solution, usually by dipping, and the penetration of the solution is enhanced when the solution is applied under reduced pressure or vacuum, the impregnation being complete when the evolution of gas bubbles ceases. The final loading of transition metal compound is influenced by various factors, such as the concentration of the solution of the transition metal nitrate, the immersion time and the porosity of the carbon cathode, as well as the number of times the cathode is dipped into the impregnating solution. The impregnated structure is advantageously dried at ambient or slightly elevated temperature. Subsequently the transition metal nitrate is converted probably to the oxide or a surface compound. When the aforementioned transition metal nitrates are used, heating to about 70° to 340° C., depending on the nitrate used, is required for such conversion. The cathode can be formed by using a metal grid structure to which the carbon is applied. Suitable metal grids are nickel, nickel alloys, stainless steel, nickel plated steel, aluminum or the like. Alternatively, the carbon cathode may be self-supporting.

Various processes of production may be used. A representative embodiment of a process for producing composite carbon cathodes according to the present invention comprises mixing carbon black with graphite (if graphite is used), adding a liquid dispersant and a mechanical binder, the quantity of the liquid being adequate to form small, generally spherical globules. The resulting mixture is given the desired shape, such as sheet, cylinder or the like, the dispersant is evaporated and the binder is stabilized at an elevated temperature. The resulting structure is impregnated with a solution of a transition metal nitrate and after this the nitrate is made to decompose, usually by heating to the required temperature. Especially suited salts for making up the impregnating solution are nickel nitrate hexahydrate, cobalt nitrate hexahydrate, ferric nitrate hexa or 9-hydrate and chromic nitrate 9-hydrate. These transition metal nitrates are most probably converted to the corresponding oxides, although the formation of non-stoichiometric surface products, involving for instance metal-carbon bonds, cannot be excluded.

The novel cathodes can be used with various reserve electrochemical cells, and especially with lithium reserve cells. They may be used with other types of reserve cells, with anodes made of metals other than lithium, such as sodium, potassium, zinc, alkaline earth metals such as calcium, magnesium and the like, or alloys of these metals (e.g. 5% calcium-lithium). The presently preferred anode material is lithium.

As stated above, a preferred embodiment of the novel cathode comprises porous carbon (with its admixtures) pressed on a current collector, or self-supported.

The novel cathodes are especially suited for lithium reserve cells provided with a lithium anode, a separator, a glass ampoule containing a predetermined quantity of electrolyte, said components being located in a suitable housing, means being provided for the easy shattering of the glass ampoule when the cell is to be activated. The cell configuration may be of the cylindric, prismatic, multielectrode or other types.

Such cells may be stored for as long as necessary without any deterioration. When the cell is to be activated, the hermetically sealed glass ampoule is shattered by applying a sharp blow to the cell, advantageously at the bottom of the cell. Activation of the cell may also be effected by subjecting the cell to a high linear acceleration, without deformation of the bottom of the cell. Also a high rotational acceleration can be used, or pyrotechnic means. Activation is usually completed within several milliseconds.

Within the cell the separator should be thin, robust, porous and electrically insulating, allowing good ionic conductivity when wetted by electrolyte; it should be compatible with the anode for the whole unactivated storage period, whilst it should be compatible with the electrolyte for the activated period of the cell. A wide variety of ceramic and plastic materials having small pore sizes are available, examples being polyethylene, polypropylene, and nonwoven glass with and without binder. Of these separators, non-woven glass is presently preferred. The ampoule containing the electrolyte should be hermetically sealed, and is usually constructed of glass. Various factors, such as the shape, heat treatment history, and the type of glass used for the ampoule determine the extent of ampoule shattering during cell activation.

The electrolyte advantageously consists of thionyl chloride ($SOCl_2$), thionyl bromide ($SOBr_2$), sulfuryl chloride ($SO_2Cl_2$), or mixtures thereof, possibly in admixture with compounds such as phosphorus oxychloride ($POCl_3$). The electrolyte is advantageously rendered anhydrous prior to its being sealed in the ampoule. In the solvent (thionyl chloride or the like), there is dissolved a compound of the type providing at least one anion of the type $X^-$, $MX_4^-$, $M^1X_6^{2-}$ or $M^{11}X_6^{2-}$ where M is selected from boron and aluminum, $M^1$ is selected from phosphorus, arsenic and antimony, where $M^{11}$ is selected from zirconium and titanium, and X designates a halogen. Suitable compounds are tetrafluoroborates, tetrachloroaluminates, tetrabromoaluminates, hexafluorophosphates, hexafluoroarsenates, hexachloroantimonates, hexachlorostannates and hexachlorotitanates. There may be used solutes providing perchlorate or chlorosulfate ions.

The solute has to provide at least one suitable cation. Suitable cations are derived from the alkali metals, such as lithium, sodium, potassium, cesium, rubidium, from alkaline earth metals such as magnesium, calcium, strontium and barium, or from lanthanide rare earth metals such as lanthanum, terbium, neodymium, cerium and samarium; suitable anions are halides such as chlorides. Other suitable cations are of the tetraalkyl ammonium type and those resulting from the reaction of a Lewis acid with the solvent. The desired anion and cation can be formed in situ in the solvent by the reaction of a Lewis base with a Lewis acid. An example is the reaction of the Lewis base lithium chloride, LiCl with the Lewis acid aluminum chloride, $AlCl_3$ to form lithium tetrachloroaluminate, $LiAlCl_4$. The electrolyte solution ought to contain at least 0.01 moles per liter of cation and of anion, the presently preferred concentration being higher than 0.1 moles of each of these. The electrolyte solution may be balanced, in which the Lewis acid/Lewis base components are present in stoichiometric quantities, or it may be unbalanced, in which the Lewis acid component is present in excess; alternatively, it may contain only a Lewis acid component with no Lewis base present. The following examples are given to enable those skilled in the art to more clearly understand and practise the present invention. They should not be considered as a limitation of the scope of the invention but merely as being illustrative and representative thereof.

EXAMPLE 1

Preparation of a Composite Cathode based on a Carbon/Graphite Mixture, and a Description of a Reserve Cell incorporating such a Cathode A composite cathode of the grid-supported type was prepared from a carbon/graphite mixture according to the present invention as follows. A quantity of 420 g of 50% compressed carbon black (Shawinigan Products Co., Englewoods Cliffs, N.J., USA) was dry mixed during 5 hours with 60 g graphite. A quantity of 2 liters 60% aqueous propanol was added and mixing was continued for a further 3 hours. A quantity of 60 g of a 60% PTFE suspension in water was added to the slurry and the mixture was thoroughly mixed until a uniform dispersion was attained. The slurry thus obtained was applied to a number of expanded nickel metal screens each of linear dimensions 30×30 cm, having open area 76% and strand width 0.18 mm, the screens being coated to a depth of about 3-5 mm. The final thickness of about 1.5 mm was obtained by passing through 2 rollers. Each covered screen was dried at ambient temperature during 10 hours and after this it was cured during 2 hours at 270° C., resulting in a sheet of porous carbon adhering to the nickel grid. The sheet was cut up to the linear dimensions (4×4 cm) appropriate to reserve cell cathodes.

One of the cathodes was immersed for 30 minutes in a 7% solution of cobalt nitrate hexahydrate in a 4:1 v/v mixture of 2-propanol and water at room temperature and normal pressure. The thus saturated cathode was dried during 3 hours at room temperature, and was then heated for 2 hours at 130° C., most likely converting the cobalt nitrate to cobalt oxide.

A reserve cell wherein a composite cathode of the present invention is used, is illustrated with reference to FIG. 1.

The reserve electrochemical cell (10) is comprised of a glass ampoule (11) which contains 2.3 cm$^3$ of electrolyte (14), comprising 1.0M lithium aluminum tetrachloride, $LiAlCl_4$, and 0.5M of aluminum chloride $AlCl_3$, dissolved in thionyl chloride, $SOCl_2$. The ampoule (11) is surrounded by a metallic cylindrical conductor (15) which is made of stainless steel type 304L. The metallic conductor (15) is pressed onto the cathode (16), the cathode being of the type described above. The complete cathode structure is connected via a nickel tab (24) to the positive terminal (22).

The linear dimensions of the cathode (16) are 4×4 cm. The cathode (16) is surrounded by a non-woven glass separator (17) which assures that no direct contact between the carbon cathode and the anode is possible. At the top of the cell an insulating disc of teflon and a layer of non-woven separator (25) is placed to prevent contact between the cathode and the metal cover; these protect the ampoule from external vibration and shocks while at the same time allowing directional force at the bottom of the case to shatter the ampoule at the time of activation. At the bottom of the cell a further teflon disc (26) and a layer of separator (18) is placed to prevent contact between the cathode and the metallic case.

A metallic lithium anode (19) of linear dimensions 4×4 cm is swaged against the inside of the metallic cell case (20). The case (20) and the cover (21) are made of nickel plated cold-rolled steel. The cover (21) is welded to the case by TIG welding. The pin (22) in the cover (21) serves as a positive terminal; this terminal is insulated from the cover (21) by a glass-to-metal seal (23). The completed cell is 48 mm high with diameter 16 mm; The assembly is carried out under 1% relative humidity.

Cell activation is accomplished by applying a sharp directed force to the bottom of the cell case (20), using a pyrotechnic activator whose activation time is 4 mSec.

The cell was thermally equilibrated at −40° C. and then pyrotechnically activated. The rise time of the cell voltage under a constant load of 1300 ohms was recorded on a fast response recorder. The rise time to 3 V was found to be 0.25 sec, whilst the cell operated for 250 hours to a 2.5 V cut-off under this load.

Equivalent results were obtained for cells in which the positions of the anode and cathode were interchanged, but in this case the anode was provided with a plurality of small holes to enhance permiation on the electrolyte upon shattering of the ampoule.

EXAMPLE 2

(Not part of the invention)

A reserve cell was made as in Example 1, but using a prior art cathode, which consisted of a cured cathode which was not impregnated in a transition metal salt solution. The electrolyte in the ampoule was of the balanced type containing 1.5M $LiAlCl_4$. At −40° C. with the 1,300 ohm load, the rise time of the cell to 3.0 V was greater than 5 secs.

EXAMPLE 3

(Not part of the Invention)

A reserve cell was made as in Example 2, with a prior art cathode, but the electrolyte in the ampoule was the same unbalanced electrolyte as used in Example 1 (1.0M $LiAlCl_4$ and 0.5M LiCl). At −40° C. with the 1,300 ohm load, the rise time of the cell to 3.0 V was above 5 secs.

Figure 2:
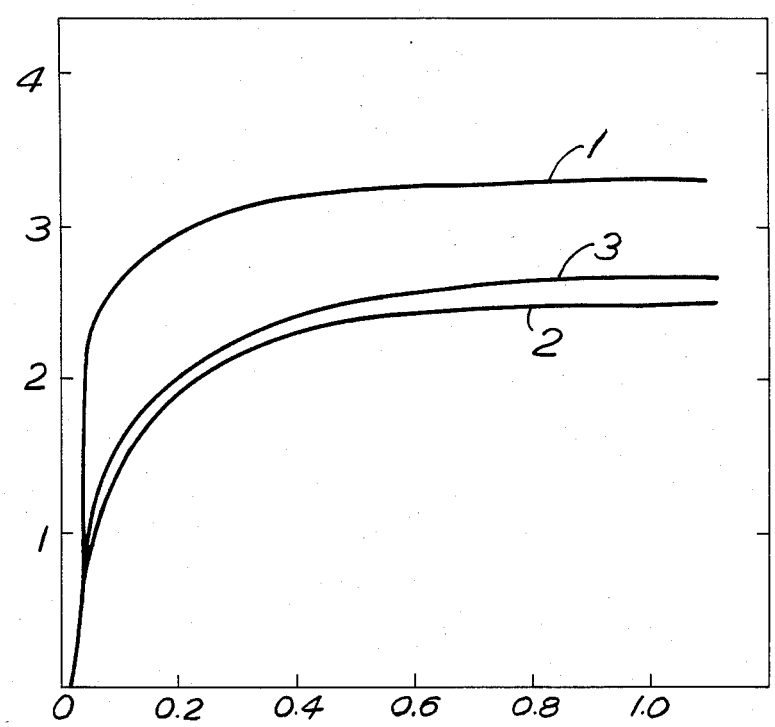
FIG. 2 is a graphical representation of the rise time of voltage for cells in accordance with the present invention and those of the prior art.

The experimental results are shown graphically in FIG. 2, indicating a much reduced rise time when the cobalt oxide composite cathode was used, as compared to the cell with prior art cathodes.

EXAMPLE 4

A composite cathode was prepared as in Example 1, but the cathode was immersed in a 30% cobalt nitrate hexahydrate solution in place of the 7% solution. The reserve cell was fabricated as in Example 1, with the same electrolyte (1.0M $LiAlCl_4$ and 0.5M $AlCl_3$) in the ampoule. At −40° C. with a 1,300 ohm load the rise time to 3.0 V was 0.08 secs, and the cell operated for 250 hours to a 2.5 V cut-off.

EXAMPLE 5

A composite cathode was prepared as in Example 1, but the impregnating solution was 10% cobalt nitrate hexahydrate. The reserve cell was fabricated as for Example 1, with an electrolyte 0.5M in $LiAlCl_4$ and 1.0M in $AlCl_3$. At room temperature the rise time to 2.0 V with a 2 ohm load, was 0.15 secs. The cell operated for 118 minutes to a 2.0 V cut-off under this load, displaying an average voltage of 2.5 V.

EXAMPLE 6

A composite cathode was prepared as in Example 1, but the impregnating solution was 8% nickel nitrate hexahydrate. The reserve cell was fabricated as for Example 1, with an electrolyte 0.5M in $LiAlCl_4$ and 1.0M in $AlCl_3$. At −40° C. with a 1,300 ohm load the rise time to 3.0 V was 0.4 secs, whilst the cell operated for a total of 260 hours to a 2.5 V cut-off under this load.

EXAMPLE 7

A composite cathode was prepared as in Example 1, but the impregnating solution was 14% $Cr(NO_3)_3.9H_2O$. The reserve cell was fabricated as for Example 1, with an electrolyte 0.5M in $LiAlCl_4$ and 1.0M in $AlCl_3$. At room temperature with a 1,300 ohm load, the rise time to 3.5 V was 0.40 secs, whilst the cell operated for a total of 360 hours to 2.5 V cut-off under this load.

EXAMPLE 8

Self-Supported Composite Cathode based on Carbon without Graphite

A composite cathode of the self-supported type was prepared from carbon in the absence of graphite according to the present invention as follows.

A quantity of 500 g of carbon black of the type used in Example 1, was mixed with 1.5 liters of 50% propanol in water, and 180 g of 60% by weight PTFE suspension in water was added and mixed until a uniform mixture was obtained. The viscous mass was transferred to trays to a depth of about 3-5 mm, and was compressed to 1.5 mm thickness. Following drying at room temperature for 3 hours, the material was cured at 270° C. for 2 hours to form self-supporting sheets of cathode material. The thus obtained sheets were cut up to the linear dimensions (4×4 cm) appropriate to reserve cell cathodes.

One of the cathodes was immersed for 30 minutes in an 8% solution of cobalt nitrate hexahydrate at room temperature and normal pressure. The thus saturated cathode was dried during 2 hours at room temperature and then was heated to 170° C. during 4 hours, most probably converting the cobalt nitrate to cobalt oxide.

A reserve cell was fabricated as in Example 1, using this cathode, and the electrolyte in the ampoule was 0.5M in LiAlCl$_4$ and 0.5M in AlCl$_3$. At $-40°$ C. with a 1,300 ohm load, the rise time to 3.0 V was 0.20 secs, whilst the cell operated for 260 hours to a cut-off voltage ov 2.5 V.

EXAMPLE 9

A composite electrode without graphite was made as in Example 8, but the impregnating solution was 7% cobalt nitrate hexahydrate. The reserve cell was fabricated as in Example 8 with the same electrolyte.

At 72° C. with a 1,300 ohm load the rise time to 3.5 V was 0.01 secs, whilst the cell operated for 310 hours to a 3.0 V cut-off.

EXAMPLE 10

A composite cathode without graphite was made as in Example 9 but the impregnating solution was 30% cobalt nitrate hexahydrate. The reserve cell was fabricated as in Example 9, but the electrolyte was 1.0M in LiAlCl$_4$ and 1.5M in AlCl$_3$. At room temperature under a 1.2 ohm load, the cell operated for 3.5 minutes to a 2.0 V cut-off.

EXAMPLE 11

A composite cathode without graphite was made as in Example 9, but the impregnating solution was 7% cobalt nitrate hexahydrate. The reserve cell was fabricated as in Example 9, but the electrolyte was 1.0M in LiAlCl$_4$. Prior to activation the cell was stored 4 hours at 135° C., and then delivered a constant current of 0.5 A for 47 minutes to a 2.0 V cut-off.

We claim:

1. A cathode for use in electrochemical cells of the lithium reserve type consisting essentially of a structure selected from self-supporting structures and grid-supported structures, of porous carbon and a binder in combination with a transitional metal oxide, said cathode producing a rapid activation of the cell to maximum voltage.

2. A cathode according to claim 1, wherein the binder is a polyfluoroethylene polymer.

3. A cathode according to claim 1, wherein the support is a grid selected from nickel, stainless steel, nickel plated steel and aluminum grids.

4. A cathode according to claim 1, wherein the carbon has a porosity of 30 to 70 percent.

5. A cathode according to claim 1, wherein the transition metal oxide is a product of heat curing a carbon cathode soaked with a solution of a transition metal nitrate which is easily decomposable at elevated temperatures.

6. A cathode according to claim 5, wherein the decomposed transition metal nitrate is selected from cobalt, nickel, iron and chromium nitrate and hydrates thereof.

7. A cathode according to claim 5, wherein the transition metal nitrate is cobalt (II) nitrate, iron (III) nitrate, Chromium (III) nitrate or nickel (II) nitrate, or a hydrate of any of these.

8. A cathode according to claim 6, wherein the oxide is the product of a decomposed cobalt nitrate hydrate.

9. The cathode of claim 1 wherein the activating time to maximum voltage is between about 0.08 to 0.4 seconds.

10. An electrical reserve cell comprising in combination a suitable inert housing, a cathode composed of porous carbon and a binder in combination with a transitional metal oxide, an oxidizable active anode, a suitable separator located between the said anode and the said cathode, an electrolyte solution contained in a hermetically sealed container which is shatterable when the cell is activated, resulting in a good contact of the electrolyte with said anode and said cathode, said electrolyte solution comprising an inorganic solvent and solute dissolved therein, said solvent serving also as cathode depolarizer, said cell being capable of rapid activation to maximum voltage.

11. A reserve cell according to claim 10, wherein the anode is a lithium anode and the electrolyte is an electrolyte suitable for lithium reserve cells.

12. A reserve cell according to claim 10, wherein the electrolyte is contained in a shatterable glass ampoule, said electrolyte comprising thionyl chloride, thionyl bromide or sulfuryl chloride, or a mixture of these, in substantially anhydrous state, containing a suitable solute.

13. A reserve cell according to claim 12, wherein the solute is the reaction product of a Lewis acid and a Lewis base, the Lewis acid compound being advantageously in stoichiometric excess over the Lewis base component.

14. A reserve cell according to claim 13, wherein the Lewis acid is aluminum trichloride and the Lewis base is lithium chloride.

15. A lithium reserve cell according to claim 11, with rapid current rise time, comprising a lithium anode, a composite cathode according to claim 1, a glass ampoule containing thionyl chloride and a suitable solute, a suitable separator, and an inert housing, terminals being provided for the current uptake from the cell.

16. The cell of claim 10 wherein the activating time to maximum voltage is between about 0.08 to 0.4 seconds.

* * * * *